(12) United States Patent
Louwsma

(10) Patent No.: US 7,924,373 B2
(45) Date of Patent: Apr. 12, 2011

(54) DISPLAY PANEL AND METHOD FOR THE SAME

(75) Inventor: Hendrik Louwsma, Heerlen (NL)

(73) Assignee: Chimei Innolux Corporation, Miao-Li County (TW)

(*) Notice: Subject to any disclaimer, the term of this patent is extended or adjusted under 35 U.S.C. 154(b) by 512 days.

(21) Appl. No.: 12/054,116

(22) Filed: Mar. 24, 2008

(65) Prior Publication Data
US 2009/0021674 A1    Jan. 22, 2009

Related U.S. Application Data

(60) Provisional application No. 60/950,732, filed on Jul. 19, 2007.

(51) Int. Cl.
*G02F 1/1335* (2006.01)

(52) U.S. Cl. .................... 349/106; 349/15; 349/110

(58) Field of Classification Search .................. 349/106, 349/15, 187, 110; 345/6; 348/54; 359/462
See application file for complete search history.

(56) References Cited

U.S. PATENT DOCUMENTS

| | | | | |
|---|---|---|---|---|
| 5,991,073 A | * | 11/1999 | Woodgate et al. | 359/462 |
| 6,040,807 A | * | 3/2000 | Hamagishi et al. | 345/6 |
| 7,119,869 B2 | * | 10/2006 | Kim et al. | 349/123 |

* cited by examiner

*Primary Examiner* — Thoi V Duong
(74) *Attorney, Agent, or Firm* — Tim Tingkang Xia; Morris, Manning & Martin, LLP

(57) ABSTRACT

A method for forming a display panel including the following steps is provided. A barrier layer having a plurality of openings is formed. A color filter layer having a plurality of units and a plurality of black matrix structures among the plurality of units is formed over the barrier layer. A first width of the plurality of openings and a second width of the plurality of black matrix structures are determined based on a first aperture ratio of the barrier layer and a second aperture ratio of the color filter layer.

14 Claims, 13 Drawing Sheets

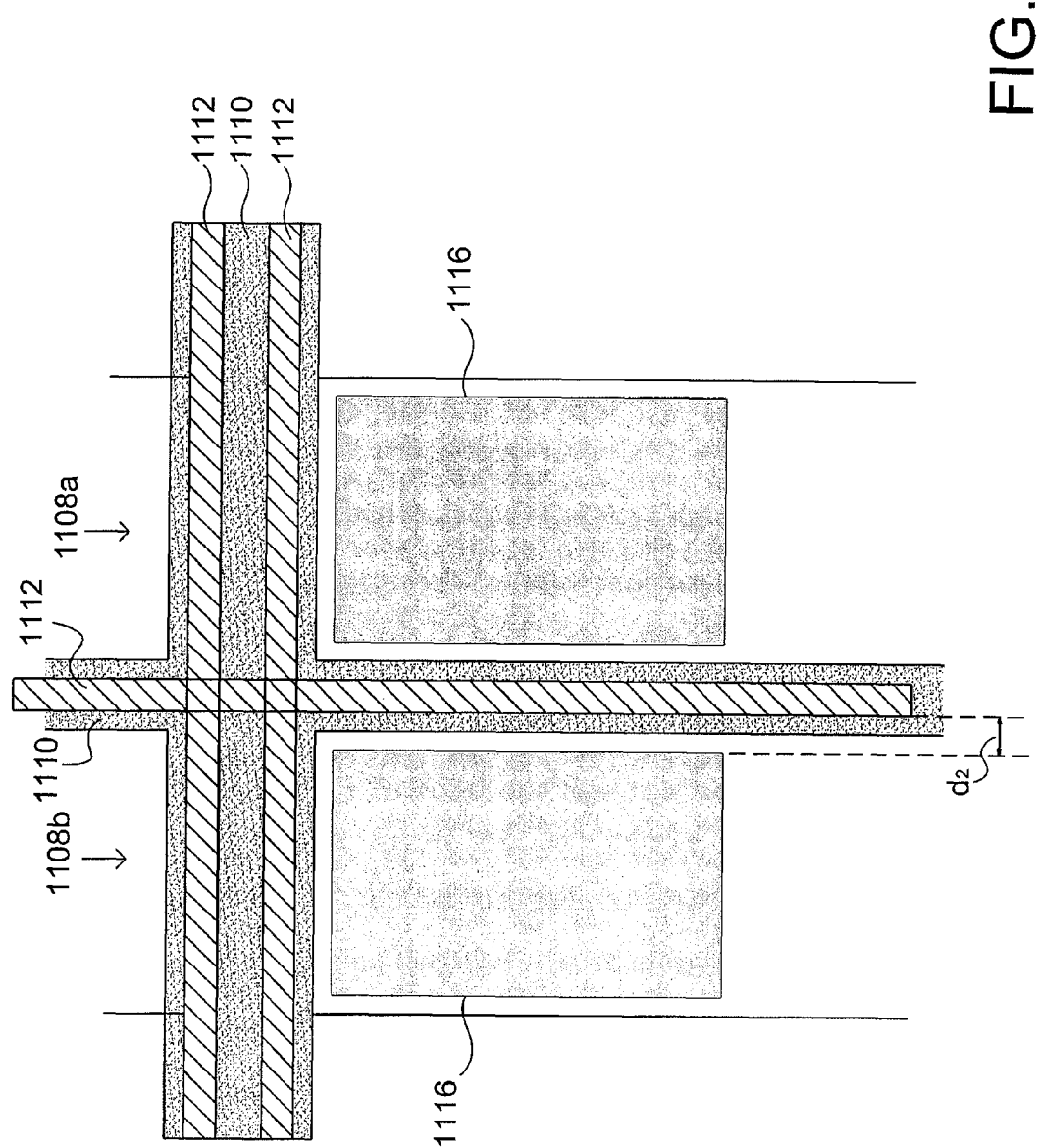

FIG. 12A

| Configuration | BM width vertical line (um) | BM width horizontal line (um) | Barrier aperture ratio | Sub-pixel aperture ratio | System aperture ratio |
|---|---|---|---|---|---|
| 7" without BM structure | 13 (data line) | 18 (Vsc line) | 7.5% | 54.1% | 4.06% |
| 7" with wide BM | 31.5 | 58.7 | 17.1% | 35.0% | 5.97% |

FIG. 12B

| Configuration | system aperture ratio | power(W) |
|---|---|---|
| 8" without BM structure | 4.06% | 24.2 |
| 8" with wide BM | 7.19% | 13.8 |

DISPLAY PANEL AND METHOD FOR THE SAME

TECHNICAL FIELD

The present invention relates to a display panel and a method for the same, and more particularly to a multi-view display panel and a method for the same.

BACKGROUND OF THE INVENTION

Multiple views of a display panel may be achieved via a barrier layer. The openings of the barrier layer output the light within specified zones, thereby cooperate with other elements of the panel to generate multiple views. However, meanwhile, the barrier layer would block a portion of the light, which means a backlight unit of a higher luminance is required. Therefore, a multiple view display panel typically has a backlight unit consuming more power than that of a conventional display panel.

Nevertheless, for applications demanding on the heat dissipation, such as display panels in the cars, smaller power consumption is desirable. Namely, a multi-view display panel with low power consumption is needed.

SUMMARY OF THE INVENTION

One object of the present invention is to provide a multi-view display panel with low power consumption and a method for the same.

One aspect of the present invention provides a method for forming a display panel including the following steps. A barrier layer having a plurality of openings is formed. A color filter layer having a plurality of units and a plurality of black matrix structures among the plurality of units is formed over the barrier layer. A first width of the plurality of openings and a second width of the plurality of black matrix structures are determined based on a first aperture ratio of the barrier layer and a second aperture ratio of the color filter layer.

The first width and the second width mentioned above may be determined based on the following steps. A difference between the first width and the second width is determined. The first width making a product of the first aperture ratio and the second aperture ratio have a maximum is obtained. At least two views may be generated by the display panel, and the difference may be determined based on a tolerable overlap between the at least two views. The first width may be substantially equal to the second width.

The method mentioned above may further include forming a plurality of array metals over the color filter layer, wherein at least a portion of the plurality of array metals overlaps the plurality of black matrix structures. Additionally, a backlight unit may be formed below the barrier layer or over the plurality of array metals.

Alternatively, the method mentioned above may further include forming a plurality of array metals between the barrier layer and the color filter layer, wherein at least a portion of the plurality of array metals overlaps the plurality of black matrix structures. Additionally, a backlight unit may be formed over the color filter layer or below the barrier layer.

Another aspect of the present invention provides a display panel including a barrier layer and a color filter layer over the barrier layer. The barrier layer has a plurality of openings. The color filter layer has a plurality of units and a plurality of black matrix structures among the plurality of units. A first width of the plurality of openings and a second width of the plurality of black matrix structures are determined based on a first aperture ratio of the barrier layer and a second aperture ratio of the color filter layer.

To determine the first width and the second width mentioned above, a difference between the first width and the second width may be determined and the first width making a product of the first aperture ratio and the second aperture ratio have a maximum may be obtained. At least two views may be generated by the display panel, and the difference may be determined based on a tolerable overlap between the at least two views. The first width may be substantially equal to the second width.

The display panel mentioned above may further include a plurality of array metals over the color filter layer, wherein at least a portion of the plurality of array metals overlaps the plurality of black matrix structures. Additionally, the display panel may further include a backlight unit below the barrier layer or over the plurality of array metals.

Alternatively, the display panel mentioned above may further include a plurality of array metals between the barrier layer and the color filter layer, wherein at least a portion of the plurality of array metals overlaps the plurality of black matrix structures. Additionally, the display panel may further include a backlight unit over the color filter layer or below the barrier layer.

BRIEF DESCRIPTION OF THE DRAWINGS

The invention will now be further described by way of example only with reference to the accompany drawings in which:

FIG. 11A and FIG. 11B are plan views illustrating the effect of wide black matrix structures according to the present invention; and FIG. 12A and FIG. 12B are tables showing the elevated system aperture ratio and the reduced power consumption achieved by the present invention.

DETAILED DESCRIPTION OF THE PREFERRED EMBODIMENTS

To reduce the power consumption of the display panel, a more efficient way of utilizing the backlight unit may be desirable. Elevating the aperture ratio of the display panel helps efficiently utilizing the backlight unit. The aperture ratio of a layer or a structure herein refers to the ratio of the transmissive area to the total area of the layer or the structure. One embodiment of the present invention providing a method for forming a display panel with elevated aperture ratio and the display panel thus formed are described as follows.

To elevate the aperture ratio of a multi-view display panel, a barrier layer with a plurality of openings and a color filter layer with a plurality of black matrix structures of the panel are carefully designed, especially the first width of the openings and the second width of the black matrix structures. As the system aperture ratio, namely the product of the first aperture ratio of the barrier layer and the second aperture ratio of the color filter layer, has a maximum, the design of the barrier layer and the color filter layer is optimized.

At first, a difference between the first width and the second width is determined. The difference is determined based on element dimensions of the panel and user requirements, such as a tolerable overlap between the views generated by the panel.

Figure 1:
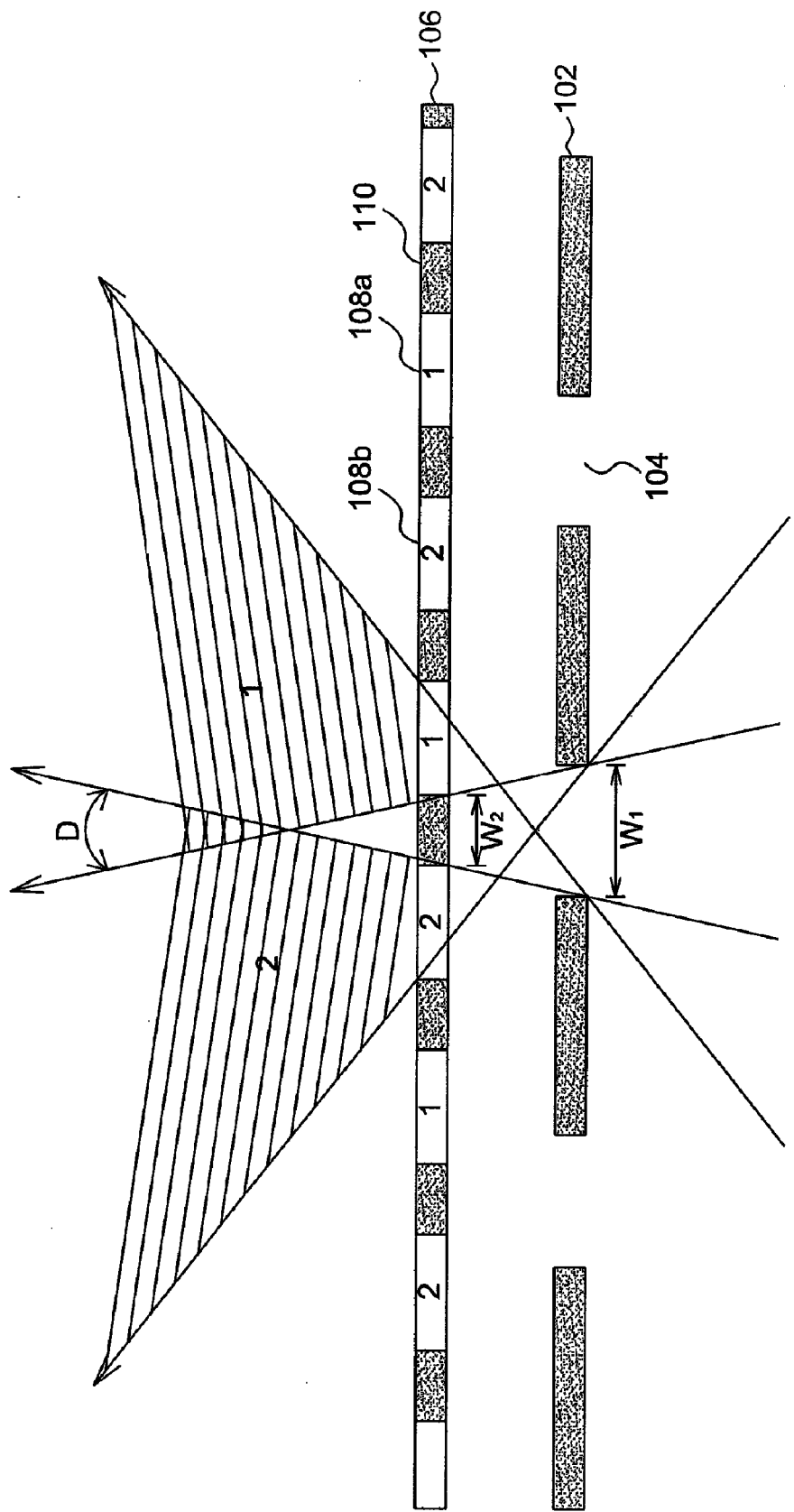
FIG. 1 is a cross-sectional view illustrating a barrier layer and a color filter layer that a first width of openings of the barrier layer larger than a second width of black matrix structures of the color filter layer.
Figure 2:
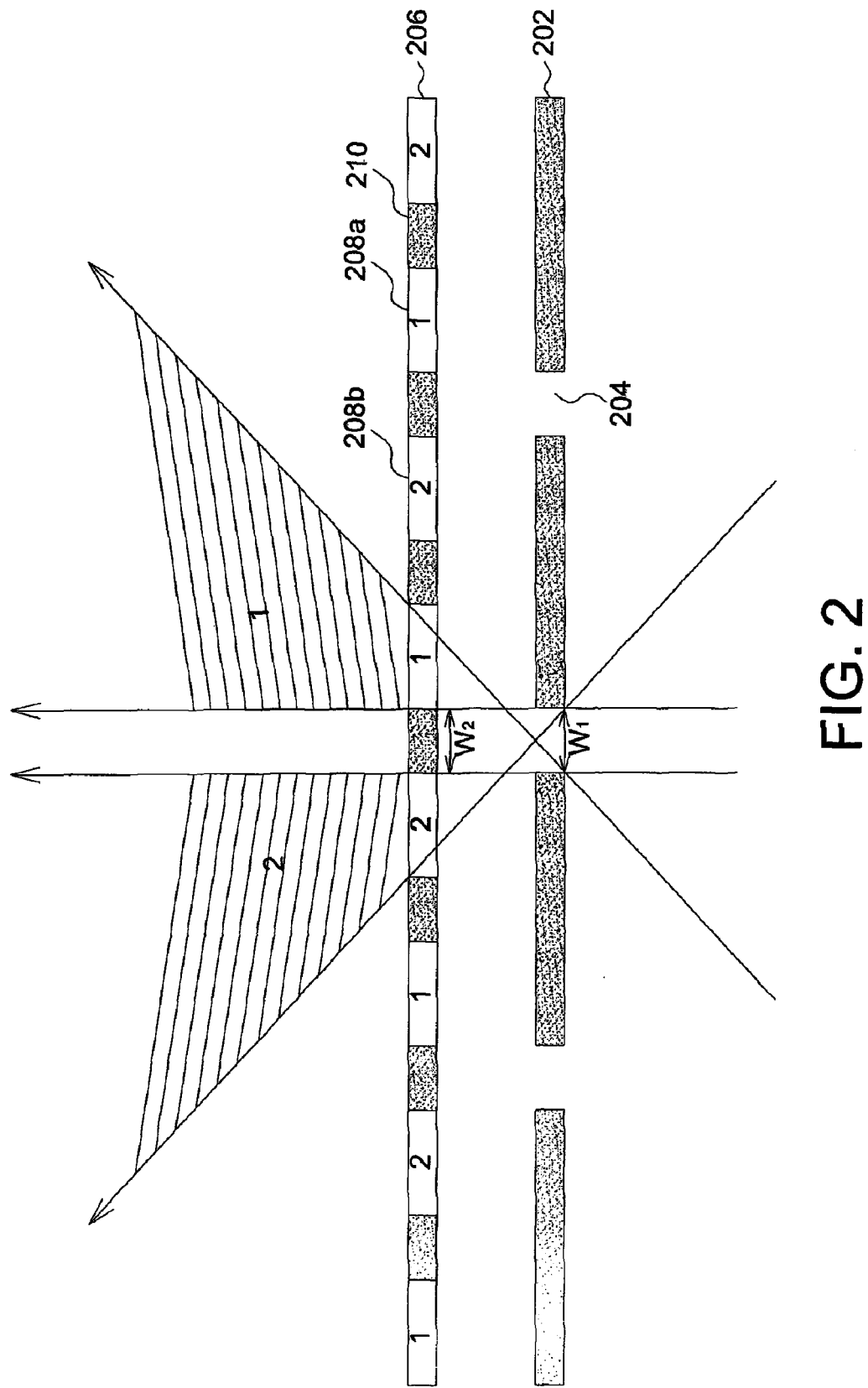
FIG. 2 is a cross-sectional view illustrating a barrier layer and a color filter layer that a first width of openings of the barrier layer substantially equal to a second width of black matrix structures of the color filter layer.
Figure 3:
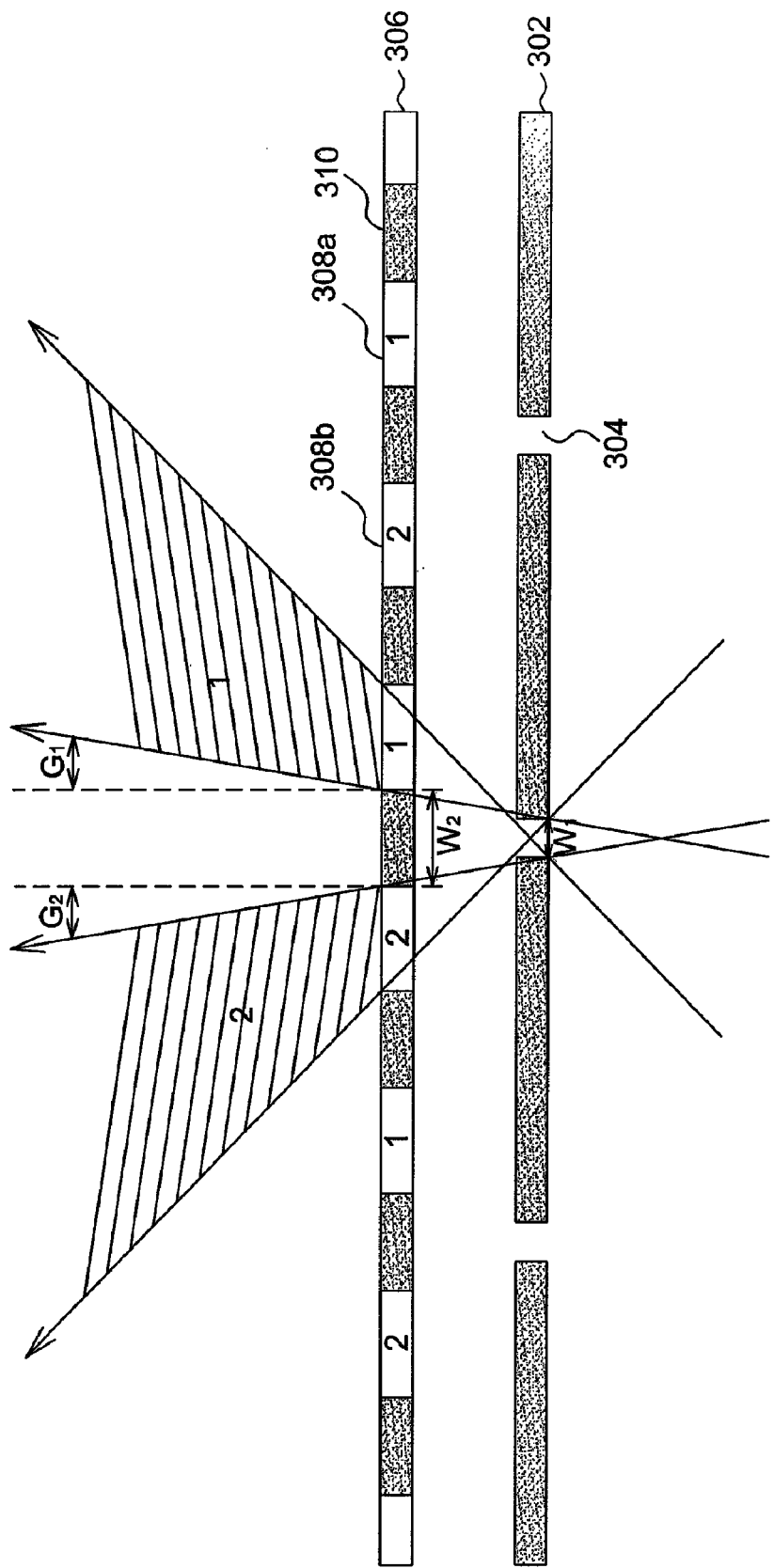
FIG. 3 is a cross-sectional view illustrating a barrier layer and a color filter layer that a first width of openings of the barrier layer smaller than a second width of black matrix structures of the color filter layer.

Referring to FIGS. 1-3, a first width of openings of a barrier layer larger than, substantially equal to and smaller than a second width of black matrix structures of a color filter layer are illustrated respectively. The barrier layers 102, 202 and 302 respectively have a plurality of openings 104, 204 and 304. The color filter layers 106, 206 and 306 respectively have a plurality of units 108*a*, 108*b*, 208*a*, 208*b*, 308*a* and 308*b*. Although the barrier layers and the color filter layers generating two views are shown here, the present invention is not limited to this.

For a first width $W_1$ of the openings 104 larger than a second width $W_2$ of the black matrix structures 110, as shown in FIG. 1, the view 1 and the view 2 generated by the barrier layer 102 cooperating with the color filter layer 106 may overlap and the crosstalk happens. For a first width $W_1$ substantially equal to a second width $W_2$, as shown in FIG. 2, the view 1 and the view 2 do not overlap and are effectively seamlessly adjacent for the viewers, since the viewers do not see the black matrix structures 210. For a first width $W_1$ smaller than a second width $W_2$, as shown in FIG. 3, a gap between the two views, $G_1+G_2$, may be resulted.

For example, if an overlap of D degrees is tolerable, as the case shown in FIG. 1, then the difference between the first width $W_1$ and the second width $W_2$ may be figured out according to the dimensions of the elements, such as the thicknesses of the barrier layer 102 and the color filter layer 106, the size of the units (e.g. sub-pixels of a display) 108*a* and 108*b*, and the distance between the barrier layer 102 and the color filter layer 106.

After the difference, for example A/10, is determined, the first width $W_1$ at which the system aperture ratio, namely the product of the first aperture ratio and the second aperture ratio, has a maximum may be obtained by the following way. Here A, such as 100 μm, is an upper limit of the width versus which we plot the aperture ratio.

Figure 4:
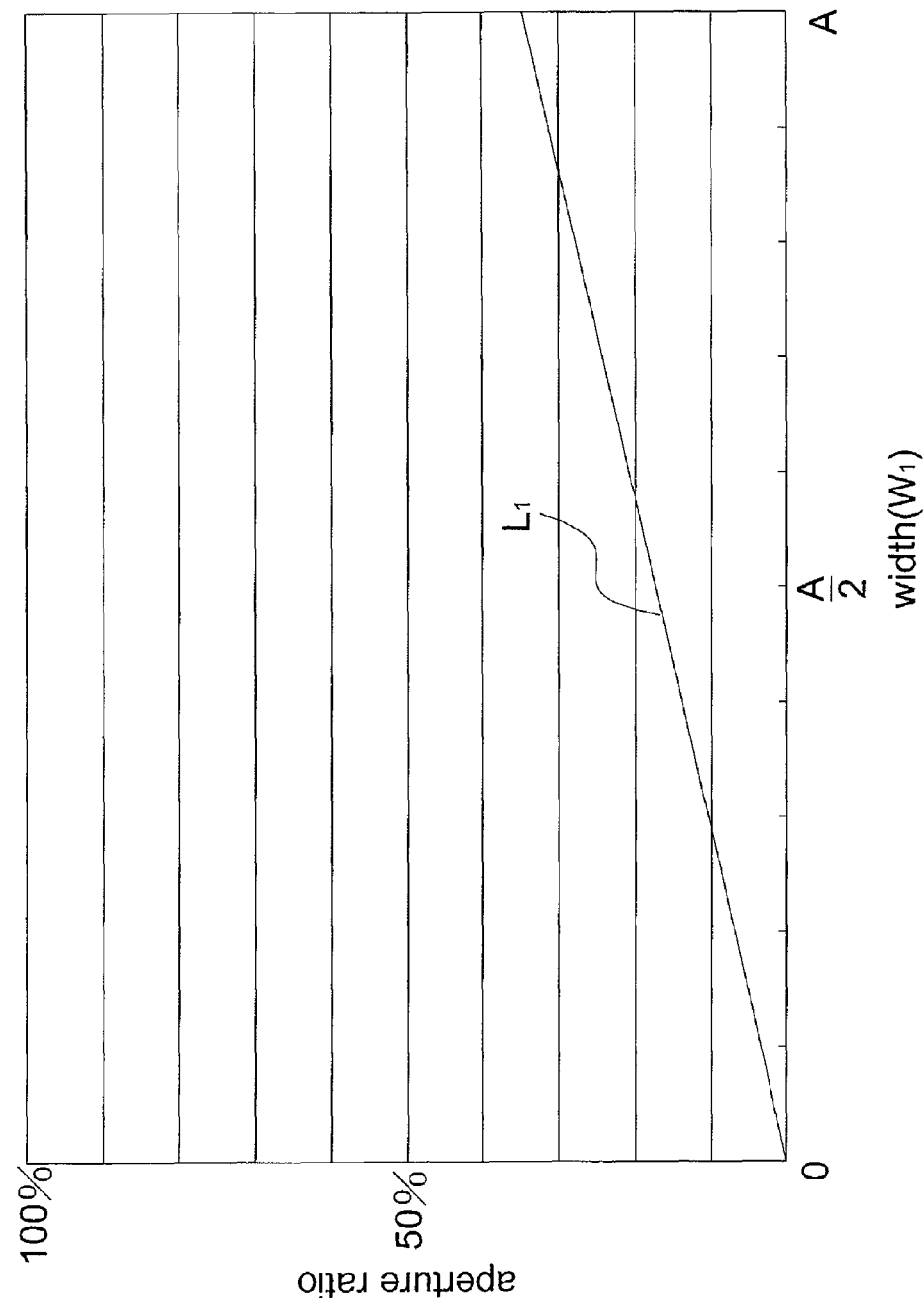
FIG. 4 depicts a curve L1 plotting the aperture ratio of a barrier layer versus the width of the openings of the barrier layer.
Figure 5:
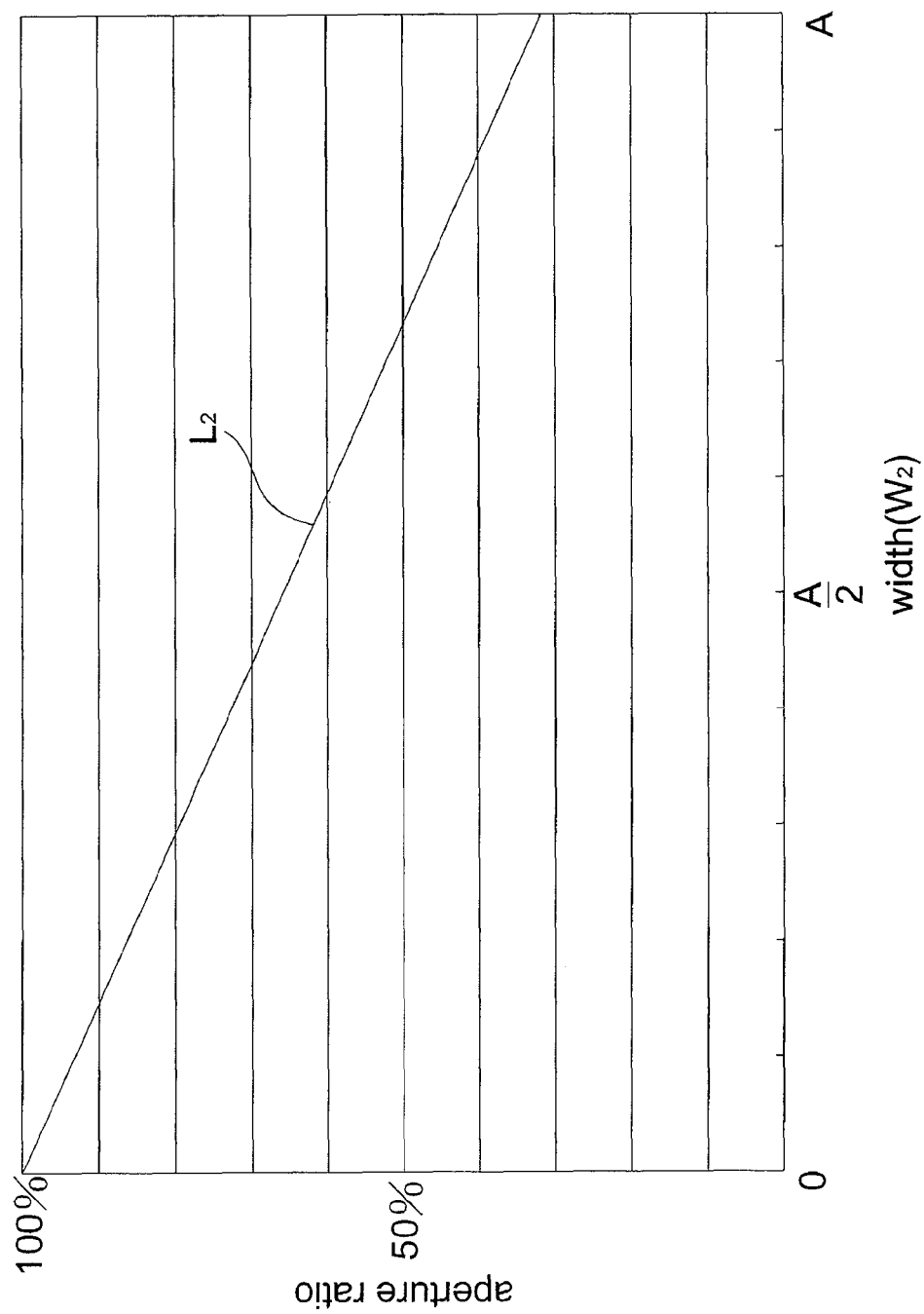
FIG. 5 depicts a curve L2 plotting the aperture ratio of a color filter layer versus the width of the black matrix structures of the color filter layer.
Figure 6:
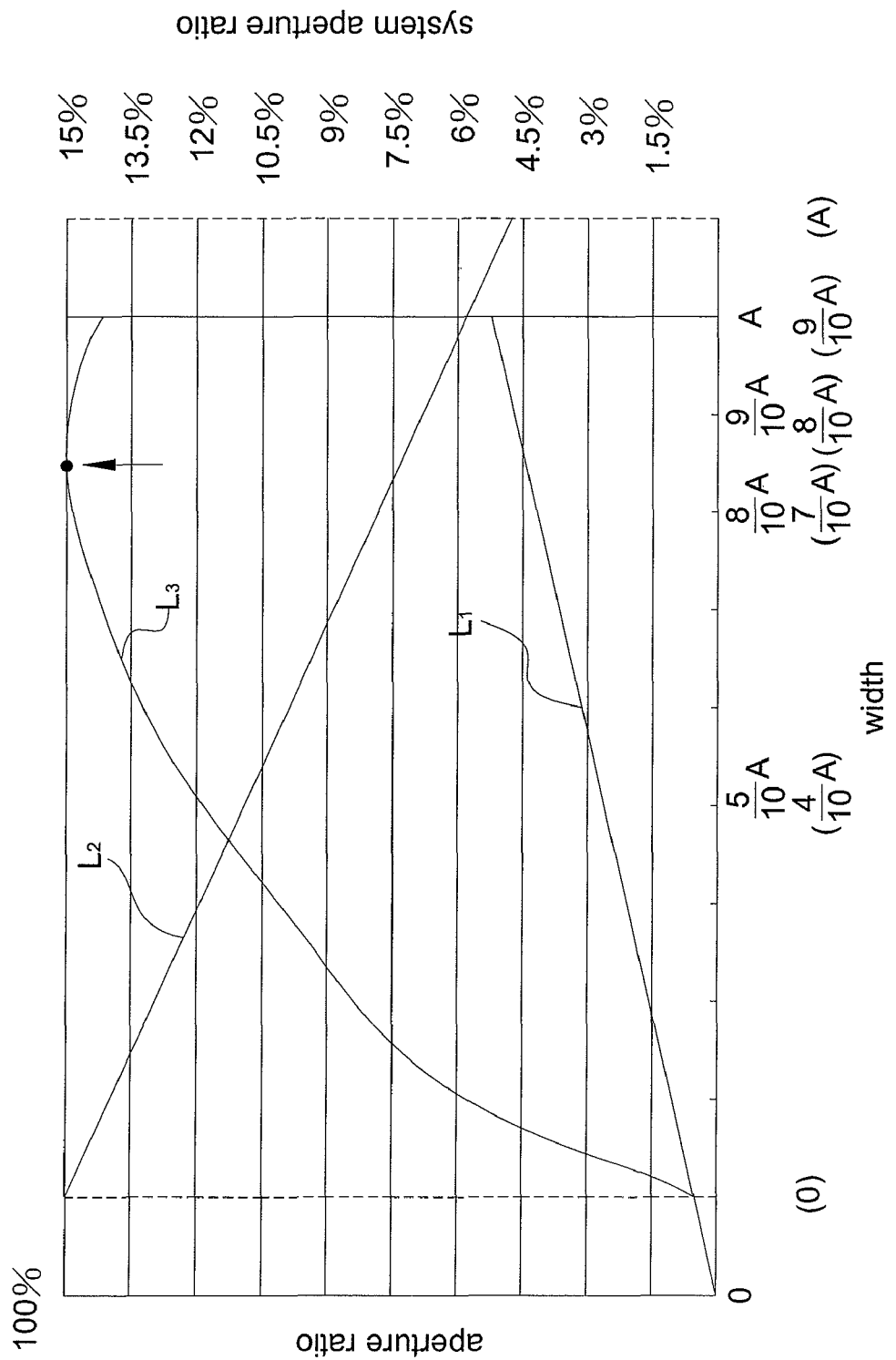
FIG. 6 depicts a curve L3 plotting the product of the curve L1 and the curve L2 shifted by A/10 versus the width.

We may first depict a curve $L_1$ plotting the aperture ratio of a barrier layer versus the width W1 of the openings, as shown in FIG. 4, and a curve $L_2$ plotting the aperture ratio of a color filter layer versus the width W2 of the black matrix structures, as shown in FIG. 5. Then the two curves may be depicted on the same plot, in which one of the two curves is shifted by the determined difference. FIG. 6 illustrates the process for a first width $W_1$ larger than the second width $W_2$ by A/10, in which the curve $L_2$ is shifted left by A/10. In other words, for the width A, the curve $L_1$ indicates an aperture ratio of about 35% for a barrier layer with an opening width A, and the curve $L_2$ indicates an aperture ratio of about 39% for a color filter layer with a barrier structure width 9A/10.

Next, the values indicated by the two curves may be multiplied to obtain a curve $L_3$. Then a maximum of the system aperture ratio, i.e. the product of the first aperture ratio and the second aperture ratio, could easily be found, such as 15% at the first width W1 8.5A/10 in this example. Therefore, a first width of 8.5A/10 and a second width of 7.5A/10 resulting in a maximum system aperture ratio are obtained. The process described above is for the case that the first width (the width of the openings) larger than the second width (the width of the black matrix structures). For a first width substantially equal to or smaller than a second width, the widths at which the system has an optimized aperture ratio and thus lower power consumption may be acquired by a similar way.

Besides the color filter layer and the barrier layer formed according to the embodiment mentioned above, a plurality of array metals and a backlight unit may further be formed. Four embodiments of thus formed display panel are shown in FIGS. 7-10. Black matrix structures are present among the units of the color filter layer and the width of the openings is shown substantially equal to the width of the black matrix structures in these embodiments, while the width of the openings may be larger or smaller than the width of the black matrix structures according to practical requirements.

Figure 7:
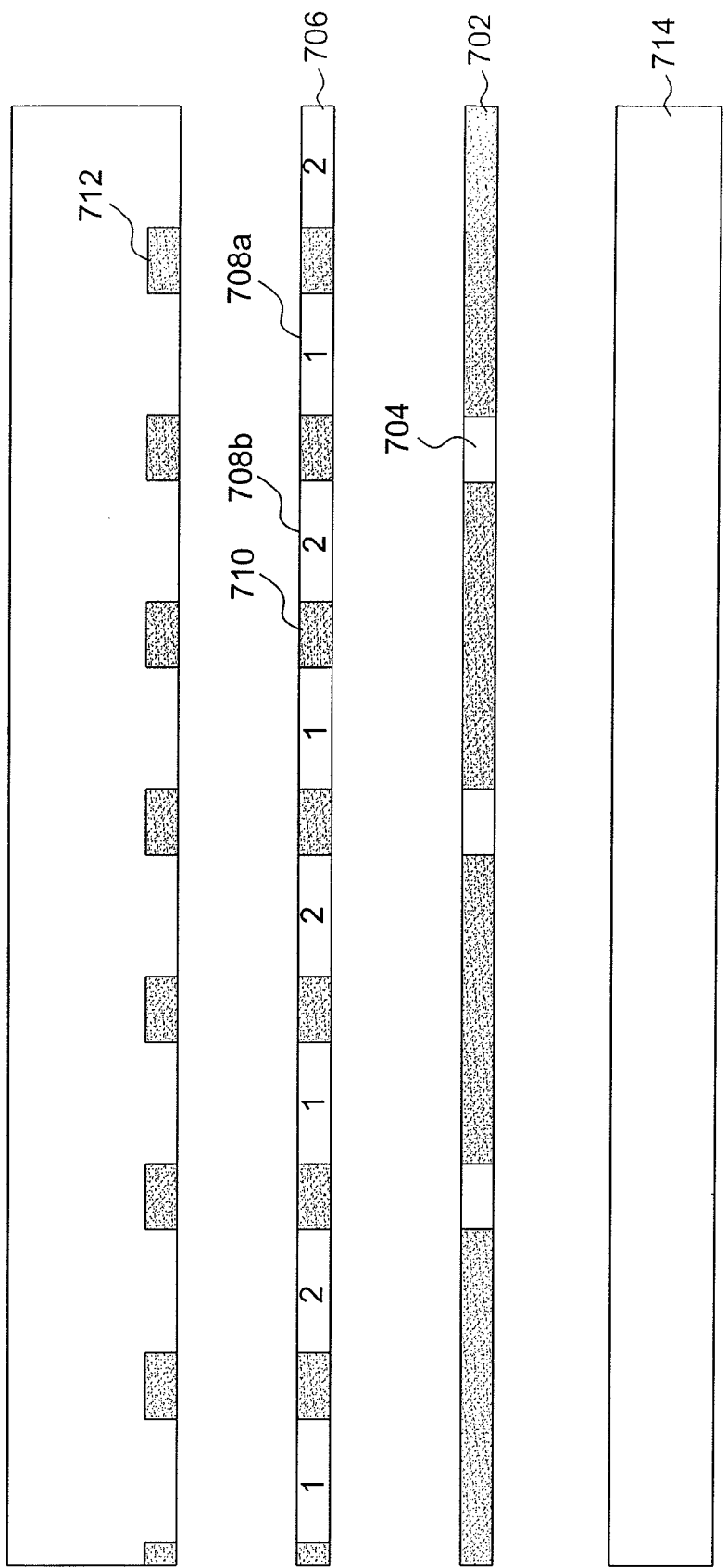
FIG. 7 is a cross-sectional view illustrating a first embodiment of a display panel according to the present invention.

FIG. 7 illustrates a display panel 700 with a rear barrier layer 702. The display panel 700 includes a barrier layer 702 and a color filter layer 706 over the barrier layer 702. The display panel 700 further includes a plurality of array metals 712 over the color filter layer 706 and a backlight unit 714 formed below the barrier layer 702. The barrier layer 702 has a plurality of openings 704. The color filter layer 706 has a plurality of units 708*a* and 708*b*, and a plurality of black matrix structures 710 among the plurality of units 708*a* and 708*b*.

For reducing the crosstalk resulted from the light reflected by the array metals 712, at least a portion of the plurality of array metals 712 overlaps the plurality of black matrix structures 710. Besides, since the electrodes of the possibly included TFTs of the panel 700 may be contained among the array metals 712, the black matrix structures 710 could prevent the TFTs from exposing to the backlight unit 714, and thus alleviate the contrast and NTSC ratio reduction due to the TFT leakage.

For the panel 700, the first width of the openings 704 of the barrier layer 702 is substantially equal to the second width of the black matrix structures 710 of the color filter layer 706. However, as mentioned above, the first width may be larger or smaller than the second width, which depends on the user requirements.

Figure 8:
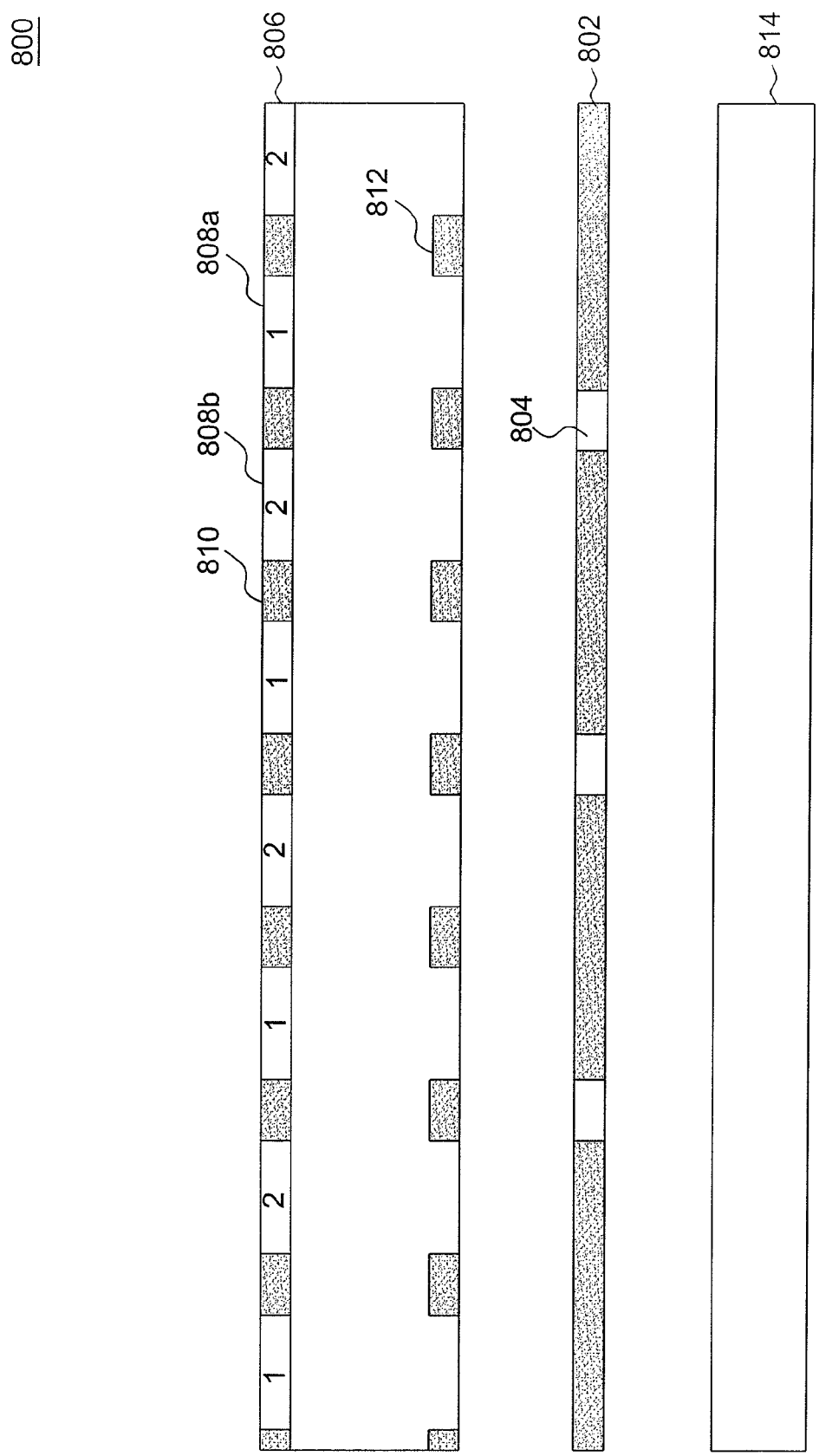
FIG. 8 is a cross-sectional view illustrating a second embodiment of a display panel according to the present invention.

FIG. 8 illustrates a display panel 800 with a rear barrier layer 802. The display panel 800 includes a barrier layer 802 and a color filter layer 806 over the barrier layer 802. It further includes a plurality of array metals 812 between the barrier layer 802 and the color filter layer 806, and a backlight unit 814 below the barrier layer 802. The design of the barrier layer 802 and the color filter layer 806, including the openings 804 and the black matrix structures 810, is similar to that of the embodiment shown in FIG. 7, while modifications may be done based on practical requirements.

Figure 9:
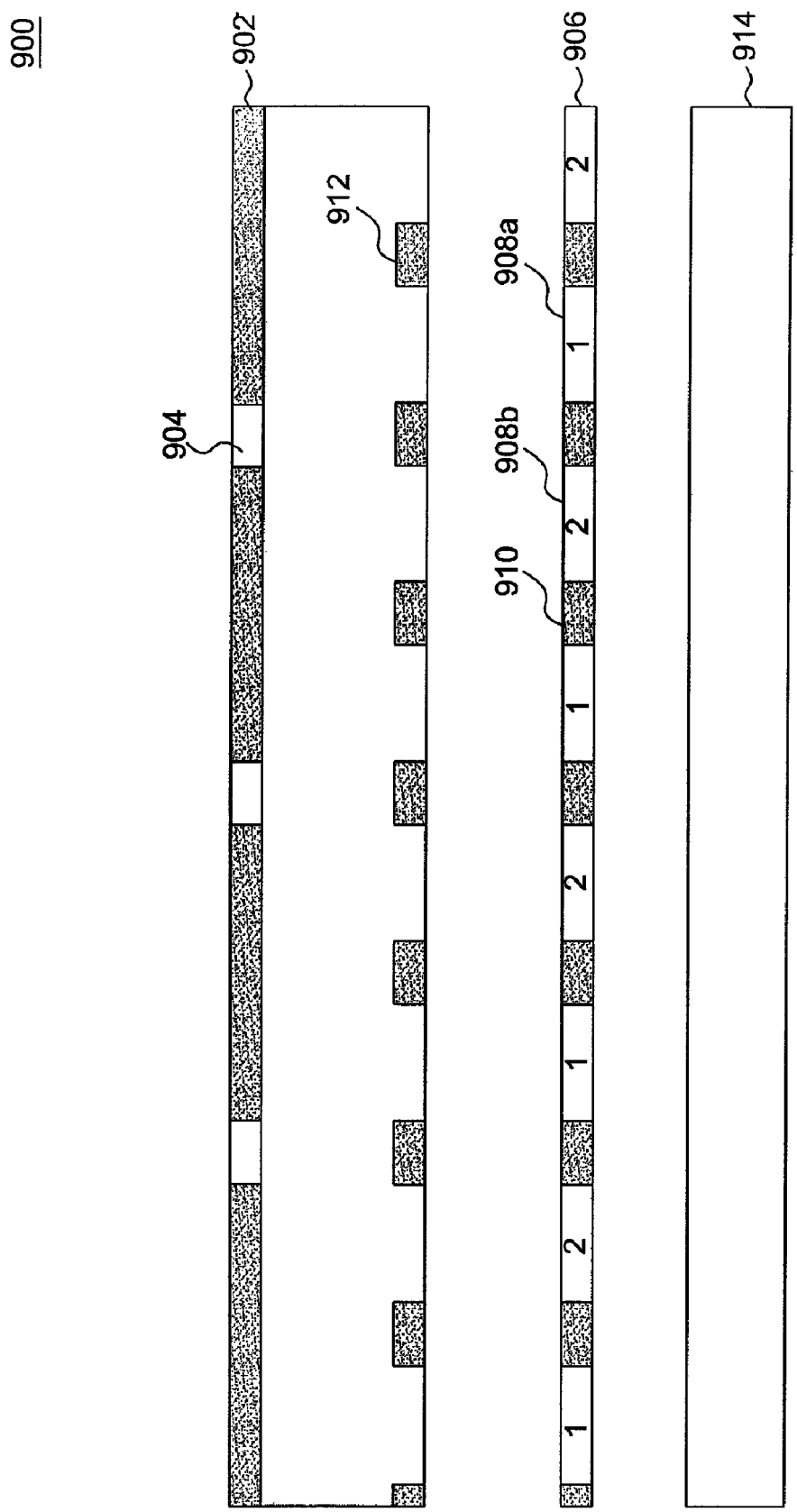
FIG. 9 is a cross-sectional view illustrating a third embodiment of a display panel according to the present invention.

FIG. 9 illustrates a display panel 900 with a front barrier layer 902. The display panel 900 includes a barrier layer 902 and a color filter layer 906 below the barrier layer 902. The display panel 900 further includes a plurality of array metals 912 between the barrier layer 902 and the color filter layer 906. The display panel 900 may further include a backlight unit 914 below the color filter layer 906. The design of the barrier layer 902 and the color filter layer 906, including the openings 904 and the black matrix structures 910, is similar to that of the embodiment shown in FIG. 7, while modifications may be done based on practical requirements.

Figure 10:
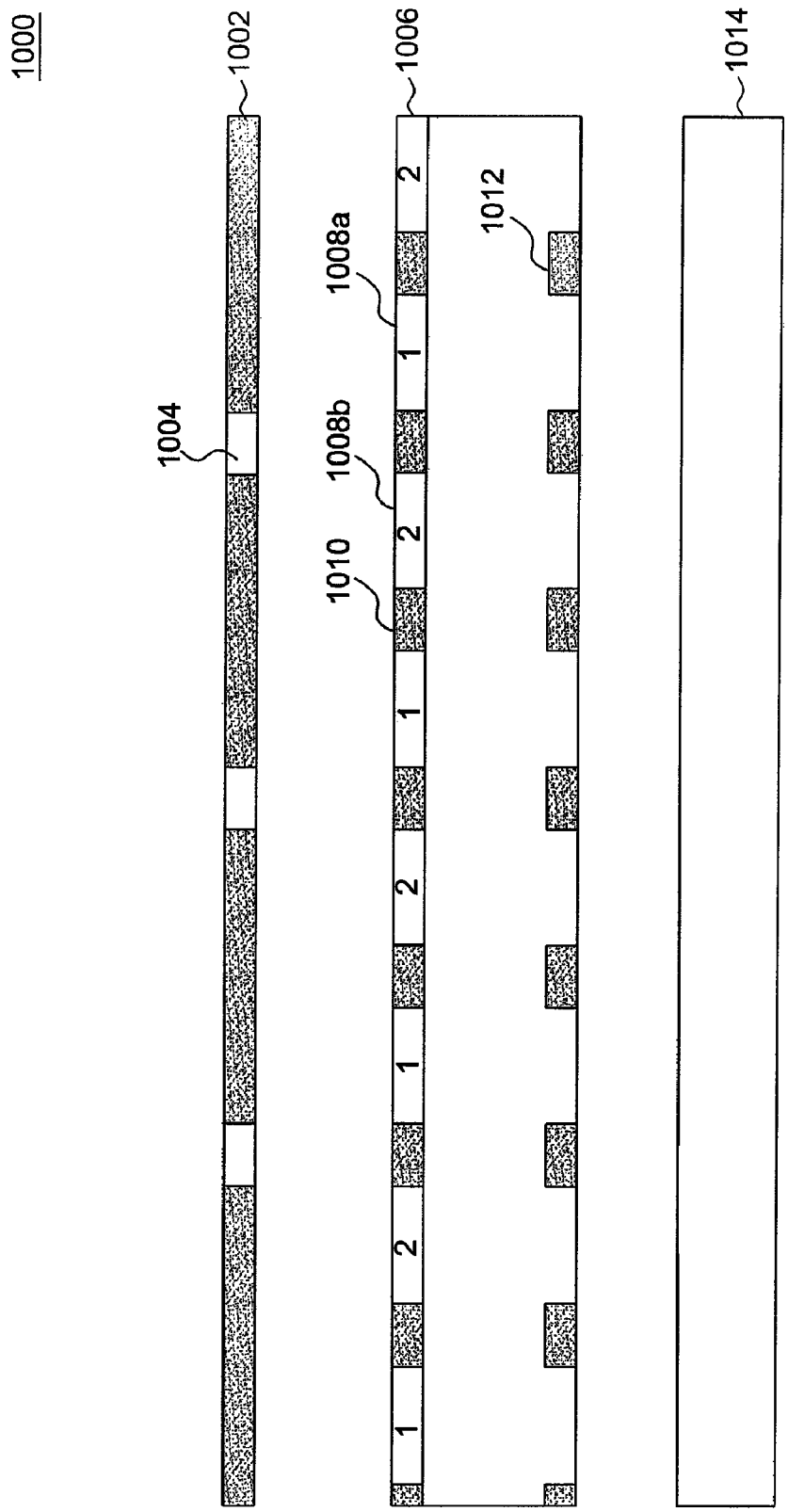
FIG. 10 is a cross-sectional view illustrating a fourth embodiment of a display panel according to the present invention.

FIG. 10 illustrates a display panel 1000 with a front barrier layer 1002. The display panel 1000 includes a barrier layer 1002 and a color filter layer 1006 below the barrier layer 1002. The display panel 1000 further includes a plurality of array metals 1012 below the color filter layer 1006. The display panel 1000 may further include a backlight unit 1014 below the plurality of array metals 1012. The design of the barrier layer 1002 and the color filter layer 1006, including the openings 1004 and the black matrix structures 1010, is similar to that of the embodiment shown in FIG. 7, while modifications may be done based on practical requirements.

Figure 11A:
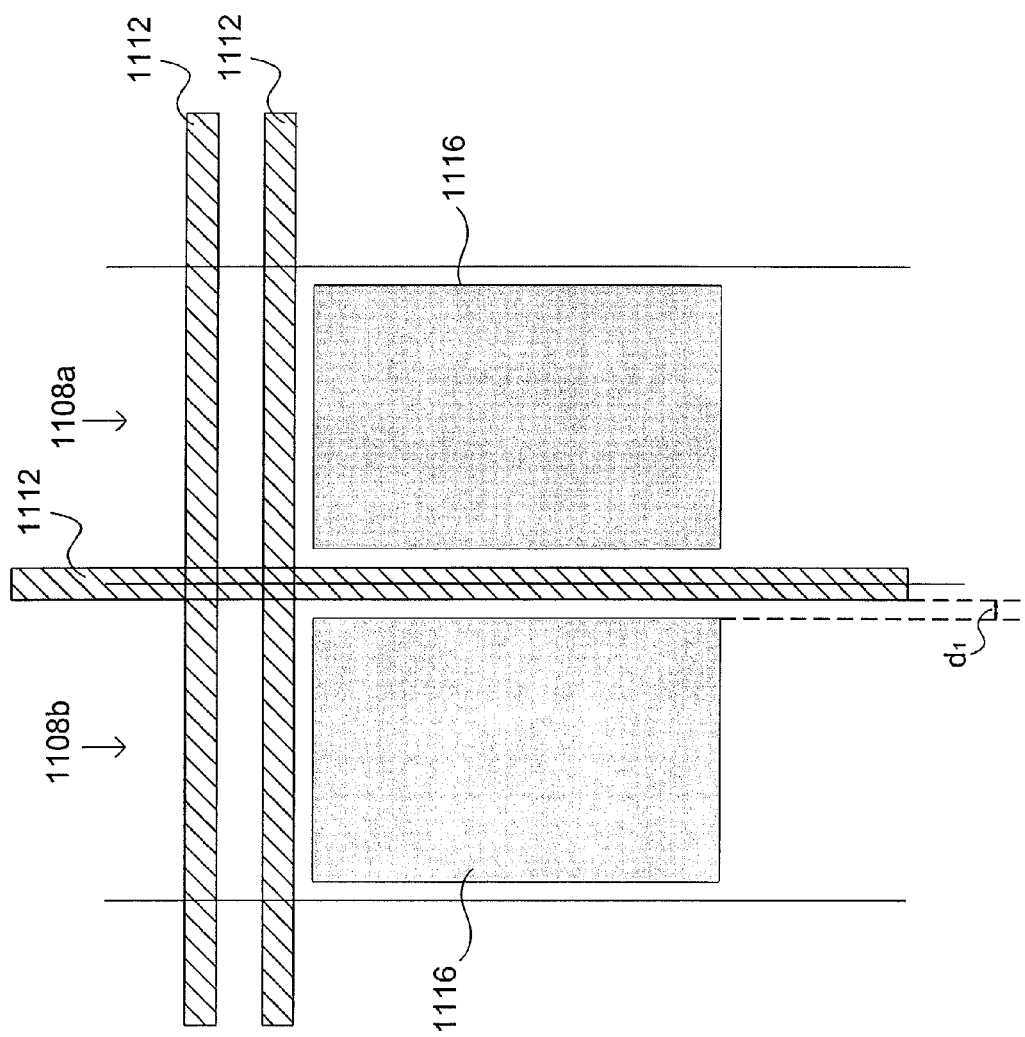

The width of the black matrix structures decided according to the present invention may be wider than the width of the array metals. FIG. 11A and FIG. 11B are plan views illustrating the effect of wide black matrix structures according to the present invention. FIG. 11A shows two sub-pixels without black matrix structures, as conventional multi-view display panels do. There are array metals 1112 and electrodes 1116 above the units 1108a and 108b of the color filter layer. The light scattered by the array metals 1112 may result in optical cross talk. Besides, the small distance $d_1$ between the array metals 1112 and the electrodes 1116 may induce electrical crosstalk. However, the black matrix structures 1110 according to the present invention, as shown in FIG. 11B, may prevent the light from being scattered by the array metals 1112 and thus alleviate the optical crosstalk. Besides, the black matrix structures 1110 may bring a larger distance $d_2$ between the array metals 1112 and the electrodes 1116, so that the electrical crosstalk is eased.

FIG. 12A and FIG. 12B are tables showing the elevated system aperture ratio and the reduced power consumption achieved by the present invention. Referring to FIG. 12A, the width of the black matrix structures and the aperture ratios of 7" WVGA dual-view display panels are shown. For the panel without black matrix structures, the system aperture ratio, namely the product of the aperture ratio of the barrier layer ("barrier aperture ratio" in the table) and the aperture ratio of the color filter layer ("sub-pixel aperture ratio" in the table), is only 4.06%. Nevertheless, for the panel with black matrix structures according to the present invention, which is much wider than the array metals (e.g. the data line and the Vsc line), the system aperture ratio is 5.97%, 1.27 times higher than that of the panel without black matrix structures. Besides, referring to FIG. 12B, the system aperture ratio and the consumed power of 8" WVGA dual-view display panels are shown. In addition to the elevated system aperture ratio, the consumed power is decreased from 24.2W of the panel without black matrix structures to 13.8W of the panel with black matrix structures according to the present invention. The power consumption is obviously reduced by employing the present invention.

The embodiments of the method for forming a display panel with elevated aperture ratio and the display panel thus formed described above are illustrated for the horizontal direction of a display. However, the present invention applies to the vertical direction of the display as well. The width of the openings of the barrier layer and the width of the black matrix structures in the vertical direction may also be determined according to the present invention, namely based on the aperture ratio of the barrier layer and the aperture ratio of the color filter layer including the black matrix structures, to obtain elevated aperture ratio and reduced power consumption of multi-view display panels.

The above description is only for preferred embodiments, but not to limit the scope of the present invention. Any other equivalent changes or modifications performed with the spirit disclosed by the present invention should be included in the appended claims.

I claim:

1. A method for forming a display panel, comprising:
   forming a barrier layer having a plurality of openings; and
   forming a color filter layer having a plurality of units and a plurality of black matrix structures among said plurality of units over said barrier layer;
   wherein a first width of said plurality of openings is determined based on a first aperture ratio of said barrier layer and a second width of said plurality of black matrix structures is determined based on a second aperture ratio of said color filter layer; and
   wherein said first width and said second width are determined based on the following steps:
   determining a difference between said first width and said second width; and
   obtaining said first width making a product of said first aperture ratio and said second aperture ratio have a maximum.

2. The method according to claim 1, wherein at least two views are generated by said display panel, and said difference is determined based on a tolerable overlap between said at least two views.

3. A display panel, comprising:
   a barrier layer having a plurality of openings; and
   a color filter layer having a plurality of units and a plurality of black matrix structures among said plurality of units over said barrier layer;
   wherein a first width of said plurality of openings is determined based on a first aperture ratio of said barrier layer and a second width of said plurality of black matrix structures is determined based on a second aperture ratio of said color filter layer; and
   wherein to determine said first width and said second width, a difference between said first width and said second width is determined and said first width making a product of said first aperture ratio and said second aperture ratio have a maximum is obtained.

4. The display panel according to claim 3, wherein at least two views are generated by said display panel, and said difference is determined based on a tolerable overlap between said at least two views.

5. The display panel according to claim 3, wherein said first width is substantially equal to said second width.

6. The display panel according to claim 3, wherein said first width is larger than said second width.

7. The display panel according to claim 3, wherein said first width is smaller than said second width.

8. The display panel according to claim 3, further comprising:
   a plurality of array metals over said color filter layer, wherein at least a portion of said plurality of array metals overlaps said plurality of black matrix structures.

9. The display panel according to claim 8, further comprising:
a backlight unit below said barrier layer.

10. The display panel according to claim 8, further comprising:
a backlight unit over said plurality of array metals.

11. The display panel according to claim 3, further comprising:
a plurality of array metals between said barrier layer and said color filter layer, wherein at least a portion of said plurality of array metals overlaps said plurality of black matrix structures.

12. The display panel according to claim 11, further comprising:
a backlight unit over said color filter layer.

13. The display panel according to claim 11, further comprising:
a backlight unit below said barrier layer.

14. The display panel according to claim 3, wherein said first width and said second width refer to the widths of said plurality of openings and said plurality of black matrix structures along the horizontal direction of said display panel, the vertical direction of said display panel, or a combination thereof.

* * * * *